Feb. 1, 1966    F. J. BENEDETTO    3,231,933
APPARATUS FOR MOLDING CONTAINERS
Filed Feb. 1, 1963    7 Sheets-Sheet 1

INVENTOR.
BY FRANK J. BENEDETTO
Daniel P. Worth

INVENTOR.
FRANK J. BENEDETTO

United States Patent Office 3,231,933
Patented Feb. 1, 1966

3,231,933
APPARATUS FOR MOLDING CONTAINERS
Frank J. Benedetto, Morton Grove, Ill., assignor, by mesne assignments, to Crown Machine & Tool Co., Arlington, Tex., a corporation of Texas
Filed Feb. 1, 1963, Ser. No. 255,556
5 Claims. (Cl. 18—5)

This invention relates to machines for molding unitary self-sustaining objects from particulate or granular-like expansible thermoplastic materials. In particular, this invention relates to a novel apparatus for manufacturing "thin wall" objects, such as food containers and the like, from polystyrene beads or the equivalent, which have been suitably impregnated with a gaseous or liquid expansion medium capable of expanding under the influence of heat. Expandable materials of the type in question are exemplified by polystyrene "beads" identified as "Q" material manufactured by Dow Chemical Co. and "Pellaspan" marketed by Koppers Co., Inc.

The characteristics of the material are such that a gaseous or liquid expansion agent may be entrapped within small pellets or beads which can be heated to their thermoplastic softening point. As this point is reached the gaseous agent expands, or if a liquid, the agent gasifies, creating an internal pressure within the beads causing the softened plastic to stretch and, hence, the beads to enlarge. This enlargement may be to several times the original size and if proper controls are exercised, the pellets or beads do not rupture but remain in closed cellular form even after expansion. When the expansion is carried out in a mold structure, the pressure exerted by the expanding beads is sufficient to cause bonding of the closed but expanded particles one to the other such that unitary self-sustaining objects can be manufactured to the exact configuration of the molds used.

This technique is well known in the art, particularly as regards the molding of large objects having considerable bulk and considerable wall thicknesses. However, molding of this type is not without difficulties since the filling and heating of the mold parts and molded object must be carefully controlled to assure adequate expansion of the beads, proper bonding of adjacent beads, one to the other, and proper temperature control must be exercised to prevent distortion or rupture of the cells, collapse of the foam, and similar defects on the molded object.

Because of the excellent insulating properties of the expanded material, it immediately became an attractive raw material from which to manufacture hot and cold insulating containers of all types. However, because of its characteristics and expensiveness, considerable problems were encountered when manufacture of "thin wall" products was attempted. Thin wall products may be generally classified as products having a wall thickness of one-quarter inch or less.

To further complicate the problem, thin wall objects, examples of which are ice cream boxes, berry containers, cups, bowls for cheese products, etc., are generally a proprietary item, i.e., manufactured for general sale as distinguished from custom or order items. Thus, proprietary "thin wall" items must compete with items for similar uses, manufactured from paper, and other cheaper plastic whereupon cost of manufacture and sales price become of paramount importance despite the fact that the expandable plastic items do have unique properties. This means that economics have to be affected in the use of a fairly expensive raw material, manufacturing costs have to be at a minimum and the products must, therefore, sell at a competitive price.

Obviously, it is not feasible, then, to manually mold proprietary items and the answer to the situation resides in automatic machinery for performing the molding operation.

The present invention is concerned with a novel machine adapted for use in the automatic molding of items such as food containers from expandable plastics, and in particular is concerned with the manufacture of thin wall proprietary items though its function is not to be interpreted as limited to this type of product.

Specifically, the invention is concerned with an apparatus incorporating unique features which overcome many of the problems involved in the molding of expandable plastic beads particularly with respect to proprietary molded articles on a continuous economical basis.

Accordingly, an object of the invention is to develop a molding apparatus for automatic manufacture of proprietary products.

A further object of the invention is to provide a novel filling system for automatic molding machines.

Another object of the invention resides in a unique mold operating system.

An additional object of the invention is to provide a novel unloading means for the molded product.

A still further object of the invention is to develop a "bank" system of molding machines operable from a central control panel.

These and other objects of the invention not referred to specifically, but nonetheless inherent therein, may be accomplished by providing a male or core mold element and a female or cavity mold element movable toward one another to form a molding cavity, a metering cup, a vacuum source in communication with both metering cup and the molding cavity defined between the mold elements, means for heating and cooling the mold parts including means for injecting steam into the molding cavity at the base of the male mold, means for cooling the molds including common lines with the vacuum source, the means source and the cooling means and including further, valve means for controlling these means. Control means are further provided for automatic operation of the apparatus and whereby "banks" of machines may be operated from a common control.

Turning, now, to a detailed description of the apparatus, it will be noted that reference is to be made to the drawing appended to and forming a part of this description. In the drawings.

It will be noted that throughout the drawings, the machine is illustrated as being vertically disposed in the sense that the movable mold element moves vertically. It should be understood, however, that the apparatus may operate in the horizontal position equally as well, it being necessary only to position a portion of the filling system in a "vertical" or upright position, as will be subsequently apparent.

Figures 1, 11:
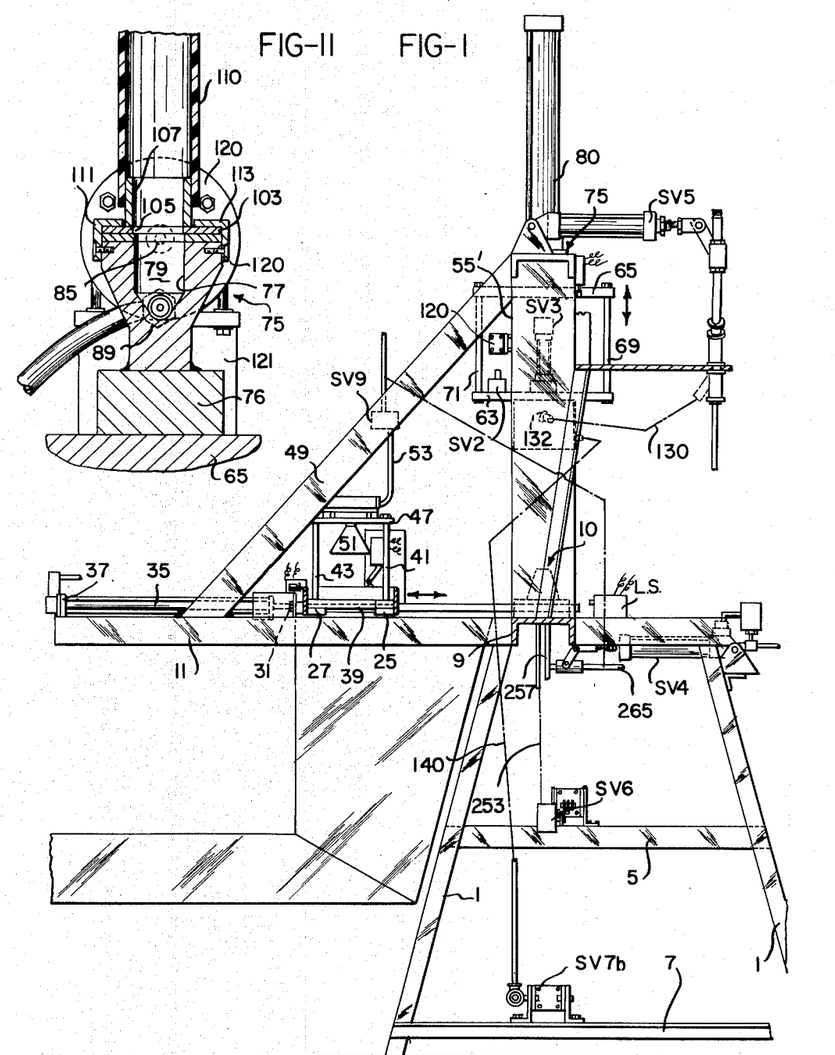
FIG. 1 is a side elevational view of a molding apparatus which incorporates features of the invention.
FIG. 11 is a sectional view taken along the line 11—11 of FIG. 10.
Figure 2:
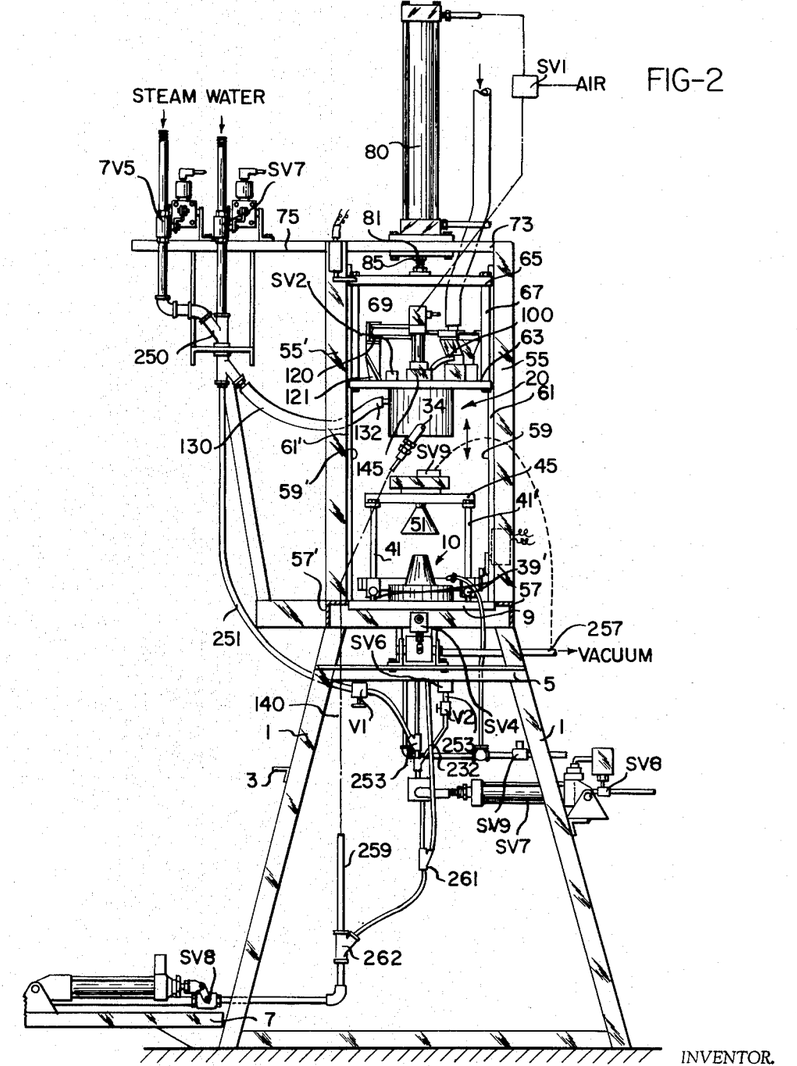
FIG. 2 is a front elevational view of the apparatus shown in FIG. 1.

As may be seen in FIGS. 1 and 2, the entire apparatus is supported on a lower stand structure comprising legs 1, suitably laced together by bracing members 3, 5 and 7. The top of the stand is comprised of a flat plate 9. The plate 9, in turn, has the male mold element 10 mounted thereon with the large end of the mold fixed to the plate 9.

Suitably fixed to the lower stand structure and extending outwardly therefrom in a plane normal to the axis of the mold parts are a pair of supports 11, 13 suitably tied together, as by welding or the like, by a series of cross braces 17. Suitably mounted via supports 19 on braces 17 and support screws 21 on plane 9 in spaced, parallel relationship in a common plane are a pair of slide bars 23, 23′. Slidably mounted on the slide bars 23, 23′ are a plurality of slide blocks, four in number, 25, 25′, 27, 27′. Extending between companion slide blocks 27, 27′ is an angle bar bracket 29 which, in turn, is connected by an adjustable coupling 31 to the piston rod 33 of a double acting pneumatic motor 35. The motor 35 is suitably mounted by any conventional means on the terminal ends of the supports 11 and 13, as by cross brace 37.

The slide blocks 25, 27 and 25′, 27′ are also tied together longitudinally by a pair of rails 39, 39′ such that actuation of motor 35 in either direction will cause the slide blocks 25, 25′ and 27, 27′ to move as an integrated unit along the slide bars 23, 23′.

Figure 3:
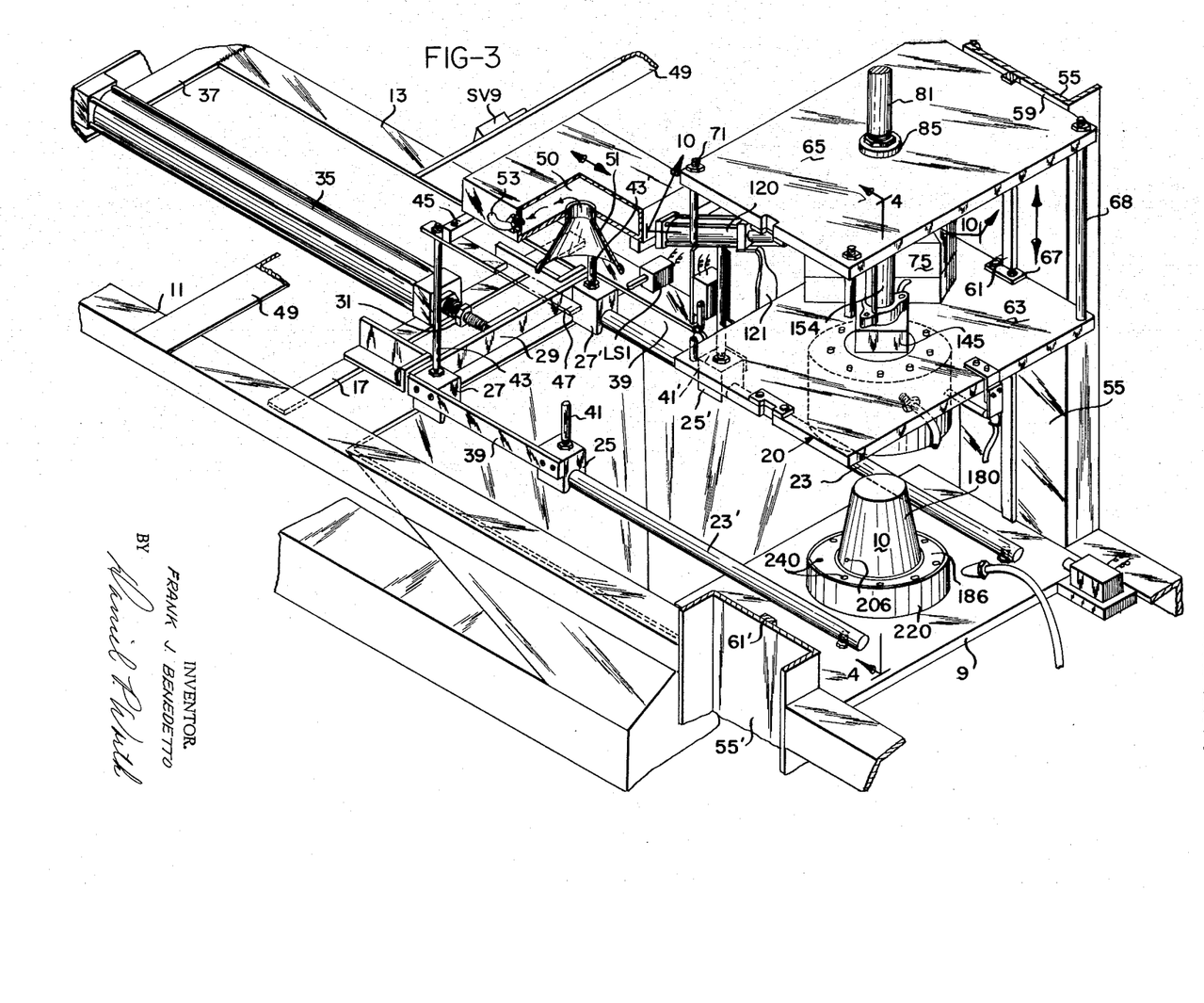
FIG. 3 is an enlarged, perspective view, certain parts removed, of the apparatus shown in FIG. 2 and taken along the line 3—3 thereof.

Fastened to each slide block 25, 25′ and 27, 27′ are posts 41, 41′, 43, 43′ of equal length, each being connected via suitable braces and cross members 45, 47 to a hollow box 50 from which depends a bell-shaped collector 51. The box 50 is, in turn, in communication via line 53 with a vacuum source such as a pump or the like. Since the collector 51 is in communication with the interior of chamber 50 (FIG. 3), any vacuum created in the chamber 50 will be drawn automatically through the collector 51.

As is apparent in FIG. 1, the entire structure supported on slide blocks 25, 27 is movable from a position overlying the male mold element 10 to the position shown in the drawing and vice versa by actuation of the pneumatic motor 35. It will also be noted that suitable braces 49 extend upward diagonally from supports 11 and are suitably fixed to vertical posts 55, 55′, the function of the latter of which will now be described.

Suitably superimposed on the base frame to either side of plate 9 are a pair of parallel, horizontal angle iron members 57, 57′ to which are fixed, as by welding, a pair of upright, parallel posts 55, 55′. These posts may be formed of channel-beams having their respective flat sides 59, 59′ in face-to-face, parallel, spaced apart association. Centrally located on the sides 59, 59′ of posts 55, 55′ in coplanar, spaced apart and parallel association are a pair of vertical guide rails 61, 61′. These guide rails, in turn, receive the notched edges of a pair of vertically spaced, parallel plates 63, 65. The plates 63, 65 are, in turn, tied together by four spacer bolts 67, 68, 69 and 71 to define a slidable support for female or cavity mold element 20 which is suitably mounted thereon in coaxial, overlying relation to the male or core mold element 10.

The two posts 55, 55′ are tied together by a cross member 73 having a cantilevered extension portion 75. Suitably fixed to that portion of the cross member lying between the posts 55, 55′ and also coaxially disposed above mold elements 10 and 20 is a pneumatic motor 80, having a piston rod 81 extending downwardly between posts 55, 55′, the end of which is connected to the uppermost plate 65 of the two plates 63, 65 forming the slide. Preferably the connection 85 is adjustable and provides a means for properly coordinating the stroke of the piston rod 81 with the position of the mold parts 10, 20, particularly when piston rod 81 is fully extended.

In addition to supporting the female or cavity mold element, the lowermost plate 63, of the two plates 63, 65 forming the top and bottom of the slide, carries on its upper surface the mold filling elements which assure proper filling of the molding cavity.

Digressing briefly and, in particular, to FIGS. 8, 9, 10 and 11, it will be seen that there is provided on plate 63 a measuring cup 75 resting on a block spacer 76, the whole being suitably fixed to plate 63 as by welding. This cup is generally trough-like in configuration to define a chamber 77 having closed ends defined by walls 79 and 81 and its top closed by a flat plate 83 having an aperture 85 therein. Both end walls 79 and 81 are provided with threaded openings, the chamber 79 thus being in communication with a nipple-type coupling member 89 adjacent its bottom and threadedly engaged in wall 79; while the chamber 77 is also open to the atmosphere via a ported plug 91, also adjacent its bottom, threadedly engaged with wall 81.

Figure 5:
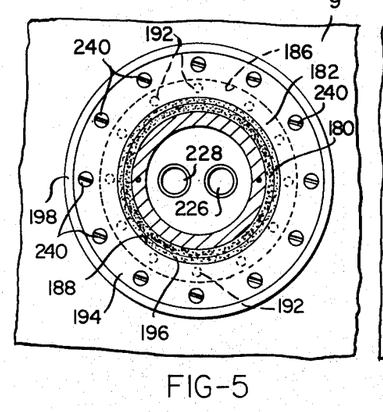
FIG. 5 is a sectional view, parts being omitted for clarity, taken along the line 5—5 of FIG. 4.
Figure 6:
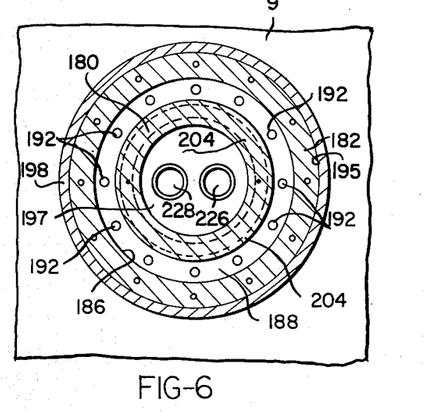
FIG. 6 is a view similar to FIG. 5 but taken along the line 6—6 of FIG. 4.
Figure 7:
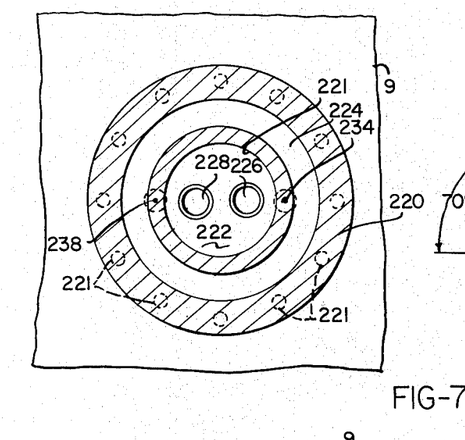
FIG. 7 is a view similar to FIGS. 5 and 6 but taken along the line 7—7 of FIG. 4.

Referring, in particular, to FIG. 5, it will be seen that the ported plug 91 is provided with a central enlarged port 93 surrounded by a series of circumferentially-spaced bleed ports 95 of lesser diameter. The central port 93 receives, in suitably fixed position, a tube 97 which extends from a point slightly outside of the chamber wall, horizontally across the chamber and has its opposite end 99 disposed generally centrally of and terminating a considerable distance within the nipple 89. It will also be noted that nipple 89 is in communication with a flexible tube 100 held in place on its outer end by a conventional clamp 101. Tube 100 is a filling tube which, in turn, is in communication with cavity or female element 20, as will be hereinafter described in detail.

Again referring to FIGS. 10 and 11, it will be seen that the closure plate 83, which covers the top of chamber 7, is intimately associated with a valve plate 103 which is slidably mounted thereover. Valve plate 103 is also apertured at 105, the diameter of the aperture 105 being identical with the diameter of aperture 85 provided in plate 83. Additionally, the aperture 105 opens into a coupling nipple 107 suitably fixed to the upper surface of the plate. The coupling nipple 107, in turn, is connected to a supply tube 110 which is flexible and can accommodate movement of plate 103 from its position illustrated in full lines to its alternative position, the latter illustrated in phantom lines. Supply tube 110 is in communication at its opposite end (not shown) with a tank or receptacle capable of holding a substantial quantity of the incompletely expanded or raw bead material.

The valve plate 103 is held in place on cover plate 83 by a pair of angle members 111, 113 screw fastened to the body of cup 75 such that one leg each of the angles forms a fastening medium while the opposite legs cooperate to form guides holding the valve plate 103 down, yet permitting it to slide in a longitudinal direction over cover plate 83. The reciprocatory sliding movements of valve plate 103 are effected through the action of a pneumatic motor 120 connected by a bracket 121 to the edge of plate 65 and having its piston rod 123 adjustably connected in a well-known manner to a depending lug 125 provided on the one end of valve plate 103.

Before completing the complete description of the filling mechanism, consideration will be given to the mold parts 10 and 20 mounted on the bottom of the lower plate 63 of the elevator slide and the top of plate 9, since a portion of the filling mechanism is intimately associated with the female mold element 20. Therefore, attention is directed to FIGS. 4 through 7 which are considerably enlarged to show these parts in detail. It will be seen that the female mold element 20 is comprised of a bell-like outer shell 122 having a closed upper end 124 bolted to elevator slide plate 63 by machine bolts 125. Concentrically fixed within the shell and joined thereto at the open peripheral lower end thereof as by welding, brazing or the like, is the female mold element 126. Thus, between the shell 122 and the mold element 126, there is defined a hollow chamber 128. As will become apparent, this chamber 128 comprises a steam and water chest for heating and cooling of the mold element 126 and, hence, the interior wall of the element. For the purpose of admitting steam and water into the chamber, the outer cylindrical wall of the shell is apertured and threaded to receive a union 132 at a point closely adjacent the plate 63. Similarly, a further aperture and union 134 are provided in the cylindrical wall at a point diametrically opposite to union 132, but considerably offset below the latter union, as illustrated. Union 132 is, in turn, connected to a flexible steam and water line 130 by the usual hose clamp means 138, while union 134 is connected in a similar manner by clamp 138 to a flexible drain line 140.

Figure 4:
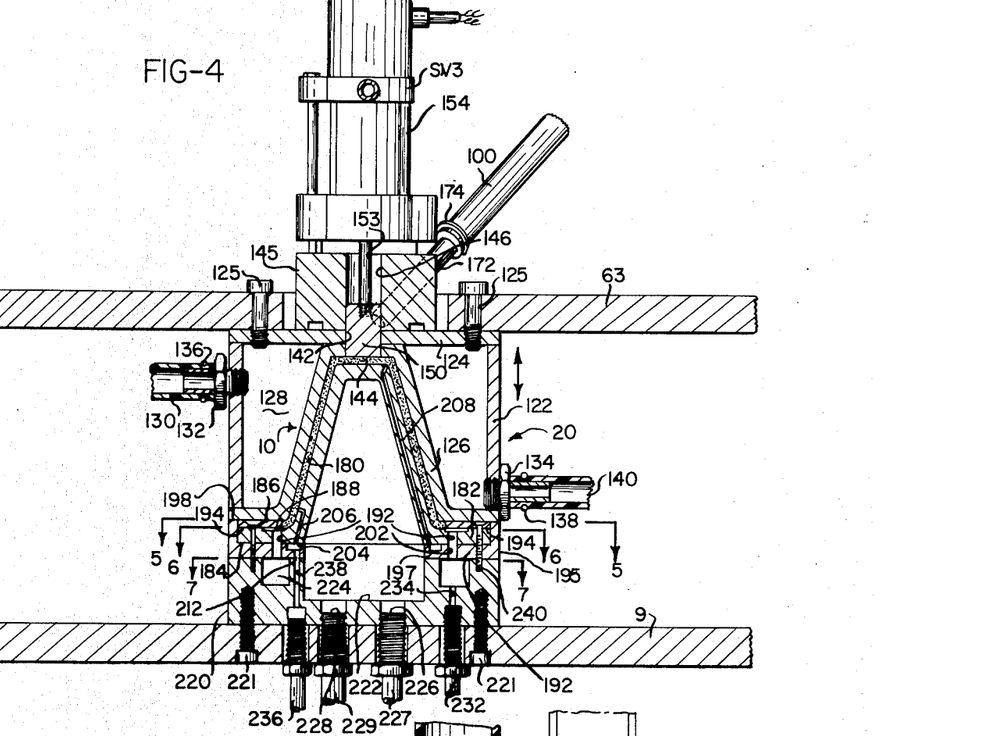
FIG. 4 is an enlarged sectional view taken through the mold parts when in closed, mold cavity-defining association.

While, in FIG. 4, the steam and water chests surrounding each mold part are shown as embracing a substantial volume, it will be appreciated that this volume may be reduced if desired by shaping the walls 112 of the female shell to a frusto-conical configuration in close proximity to, but spaced from the mold wall 126. Similarly, instead of being hollow, the core element could be provided with a frusto-conical insert having an outer wall adjacent, but spaced from, the molding surface such that a generally frusto-conical steam chamber is defined within the core.

The mold element 126 is provided with a single aperture or port 142 at its closed end which abuts against the bottom 124 of the bell-shaped shell 122. Similarly, a similar aperture or port 144 is provided in the bottom 124 of the outer shell and these two ports 144 and 142 are in coaxial relation with respect to one another.

Mounted on the back side of the bottom portion 124 of the shell 122 as by cap screws (not shown) is a ported filling block 145. This filler block is provided with a central aperture 146 of a diameter equal to that of ports 142 and 144 and disposed coaxiate therewith such that a cylindrical plunger 150 may move slidably in the cylinder which the superimposed ports define.

It will be further noted that plunger 150 is connected by a threaded connection to the reciprocating rod 153 of a solenoid operated air motor 154 such that reciprocation of the rod will move the plunger slidably in the cylindrical ports 146, 142 and 144.

Figure 8:
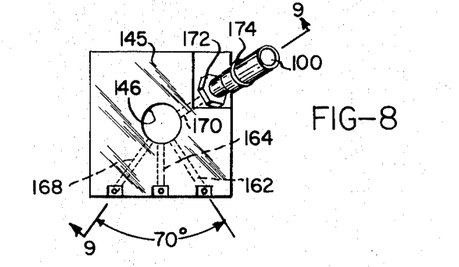
FIG. 8 is a top plan view of the filling block used in the filling mechanism.
Figure 9:
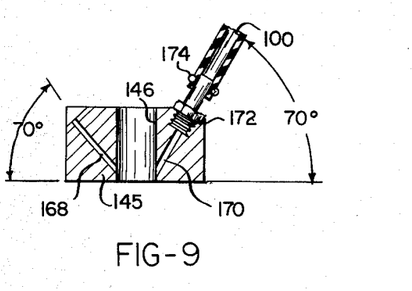
FIG. 9 is a sectional view of the filling block taken along the line 9—9 of FIG. 8.
Figure 10:
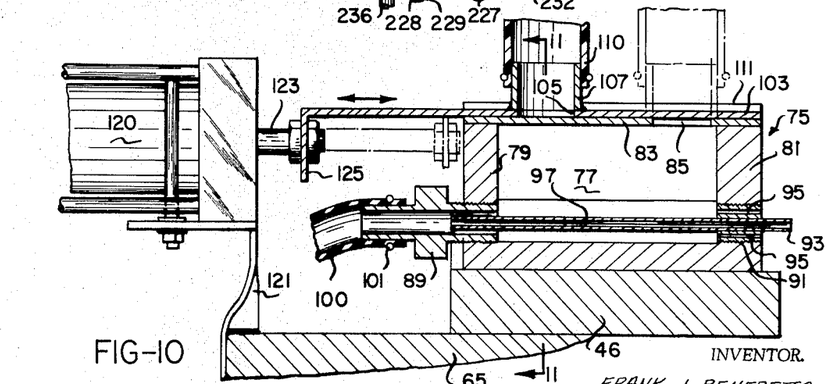
FIG. 10 is a sectional view of the interior of a metering cup arrangement for measuring a filling charge for the molding cavity.

In addition to the central aperture 146 which, along with apertures 144, 142 and plunger 150, define a valved filling port, the filler block is provided with four additional passages 162, 164, 168, 170 which extend from the upper and outer surfaces of the block downwardly toward and are in communication with the filling port 146, as clearly illustrated in FIGS. 8 and 9. Three of these passages, namely 162, 164 and 168, are vent ports, while the passage 170 is a filling passage in communication with the previously-described cup via filling tube 100 and the connector 172, threaded into the filling block. The tube 100 is clamped by conventional clamping means 174 to connector 172. Thus, as the plunger is retracted from the port 146, the four passages 162, 164, 166 and 170 will be opened. On the other hand, when the plunger is extended, as shown in FIG. 4, it will completely block the four passages and the end of the plunger is contiguous with the flat portion of the inner surface of mold element 126.

It will be noted that vent passages 162, 164 and 168 are grouped together and fan out from port 146 within an included angle of about 70°, measured along the plane in which their exterior ends are disposed. It is also to be noted that these passages 162, 164 and 168 and, as well, filler passage 170 are so inclined with respect to a horizontal plate as to define an angle of 70° therewith. The location of the latter passage 170 with respect to vent ports 162, et seq. is not necessarily as well defined, though it is desirable to have this port disposed at some position generally out of line diametrically with respect to the vent ports.

As will be subsequently apparent, a vacuum is created in the molding cavity during filling thereof. Simultaneously, the plunger 150 is retracted uncovering the interior ends of ports 162, 164, 168 and 170 creating an air current as the atmospheric pressure bleeds through ports 162 et seq. Because of the particular arrangement of the venting and filling port and because a pressure differential is created in the measuring cup 75, the bead or particulate material will be drawn therefrom down tube 100 and discharged into the molding cavity in a state of considerable agitation. It has been found that this agitation assists materially in causing a complete emasculation of any agglomerated particles or beads such that the material, even if contaminated with moisture, will completely fill the molding cavity.

In addition to the importance attached to the location of the vent and filling ports 162, et seq. in block 145, considerable significance is also to be attached to the measuring cup structure. Referring back to FIG. 5, it will be seen that as a vacuum is drawn at line 100, valve plate 103, being in the position illustrated, atmospheric pressure will cause an air flow through the tube 97 and also through the ports 95 in plug 91. As a result of the position of the end of tube 97 within the union 89 a venturi effect is created as the air rushes through the chamber 77 and the tube, thus completely evacuating the measuring cup in almost injecting the beads or particles into tube 100 down to the filling block 145 where it is further agitated and discharged onto the molding cavity.

Having thus described the essentials of the cavity or female mold structure 20, attention is again directed to FIGS. 4, 9, 10 and 11 wherein the core or male mold element 10 is shown in detail. The working or molding surface 180 of the male or core mold part 10 is as is usual, of a complementary configuration to that defined by the female or cavity mold wall 126 such that between them they define a molding cavity of a configuration so as to produce the desired product whatever it may be. Since, for the purpose of illustration, the article of manufacture is a cup or equivalent receptacle, the cavity and core mold parts are generally of complementary frusto-conical shape. Thus, the male molding surface has formed as an integral part thereof a terminal circumferential flange 182. The flange 182 is provided with a smooth annular lower surface 184. The upper surface thereof is stepped at 186, such that between the mold wall 180 and the step 186 there is defined an annular depression or groove 188. This groove is in communication with a series of evenly spaced ports 192 which extend through the flange 182. The groove is further covered in part by an annular plate 194 having its inner peripheral edge spaced from mold wall 180 but extending just inwardly far enough such that the body of the plate overlies but is spaced above the openings defined by ports 192 a slight distance.

The flange 182, in turn, seats within a further mounting plate 195 which is generally cylindrical in plane configuration having an open center 197 and cup-shaped in cross-sectional configuration whereby the flange 182 is in closely sealing relationship with the peripheral lip 198 defined at the edge of the mounting plate 194. Preferably the mating surfaces of the flange 182 and the mounting plate 195 are smeared with a sealing compound to assure there will be no leakage when these parts are assembled.

As seen in FIG. 4, the mounting plate 195 is also provided with a series of passages 202 which extend therethrough and are so positioned as to register with the passages 192 provided in flange 182 of the male mold element 180. The mounting plate also is provided with an annular groove 204 closely adjacent its inner peripheral edge, this groove being in communication with a pair of small passages 206, 208 which extend into the mold wall and terminate in open ports in the molding surface 180. The groove 204 is, in turn, in communication with a port 212 which extends between the bottom of the groove 204 and the flat bottom face of the mounting plate.

The mold mounting plate 192, in turn, is seated on a generally cylindrical manifold block 220 suitably fixed as by cap screws 221 and a sealing compound to the top surface of the plate 9. The manifold block is hollow, having a large cup-shaped chamber 222 formed in its center, this chamber, in turn, being surrounded by a further annular groove 224. The bottom of the chamber 222 is provided with apertures 226, 228 fitted with typical pipe nipples 227, 229 and also a further union 232 is in threaded engagement with the manifold block and in communication with the annular chamber 224 via a port 234. A further fitting 236 is threaded into the body of the manifold block and is in communication with the annular groove 204 and, hence, ports 206, 208 via a passage 238 drilled through the block 220. It will be noted that the base plate 9 is suitably apertured to facilitate installation of the various connectors to the bottom of the manifold block 220 which rests thereon. It will also be noted that bolts 240, having countersunk heads serve to hold the mold parts together in sealed relation to each other and the manifold block 220.

Attention is now directed to FIGS. 1 and 2 in conjunction with FIG. 4 which show, with the latter figure, the piping system to which the various ports and chambers are connected. For purposes of clarity, the various pipes and lines have been separated, it being understood that a manifold block would be used in a full commercial installation such that the various lines and valves would be supplied from the manifold block.

Thus, steam and water are controlled by valves SV5 and SV7. Both water and steam are admitted to a common line at juncture 250 and pass through line 130 to the female mold element and via line 251 to manually-regulated valve V2 then the union 227 and into the interior of the male mold element 180. Steam also passes via line 253 to valve SV6 and then via line 255 to manual control valve V1 and then to union 232 which, it will be noted, is the same nipple or connection upon which a vacuum is drawn via solenoid valve SV4 and vacuum line 257.

Water also passes through lines 130 and 251 into the male and female mold elements, respectively. It also exits the female mold element 20 via line 140 which joins with drain line 261 at 262, the latter line being connected to nipple connector 229 and both being controlled by drain valve SV10.

A vacuum line 265 is connected to solenoid valve SV4, also to vacuum line 269 which is in communication with solenoid valve SV10 and via line 53 to vacuum chamber 50.

Elevator slide cylinder is connected to a suitable source of air pressure via valve SV12 and lines 271a and b; measuring valve cylinder 120 to the source via valve SV2 and lines 272a and b and filling plunger cylinder 153 to the source via valve SV3 and lines 273a and b.

It will also be seen that valve SV8 is interposed in line 130 and that valve SV9 is a drain valve in communication with both lines 140 and 261 via a common connector and conduit system leading through the valve to a suitable drain.

Valve SV10 controls air pressure to blow-off nozzle 280 and to port 206, which valve SV11 is interposed in the vacuum line 53 leading to bell chamber 50.

Valve SV12 is a two-way valve which controls the admission and exhaust of air to the bell carriage cylinder 35.

The hand-regulated valve V1 is a balance valve enabling regulation and balance of steam between male and female mold parts on one hand and water on the other hand, while valve V2 enables adjustment of the steam injected into the interior of the molding cavity.

By the arrangement set forth, utility is made of as many common lines as possible, thus simplifying the manner of controlling the various valves, as will become apparent hereinafter.

Having fully described the structural details of the apparatus, consideration will now be given to the operation thereof in the manufacture of self-sustaining articles and to the various means, including valves, controls, etc., which may enable the apparatus to so operate. Attention, therefore, shall be given to FIGS. 12 and 13 which show in schematic and ladder diagram form, respectively, a valve system and an electric control system which will enable automatic operation of the apparatus. It might also be mentioned here that the illustrations of both valve and control systems are but examples of a mode of operation of the apparatus and, obviously, other arrangements of controls and valves are entirely feasible and are within the spirit and scope of the invention. For example, the various solenoids could operate servomotors, such as air motors, rather than bodily actuating the valves directly; hence, when reference is made hereinafter to various solenoids as operating valves, it will be understood that the valves are directly solenoid operated or operated through the servomotors illustrated in the preceding figures of the drawing.

Figure 12:
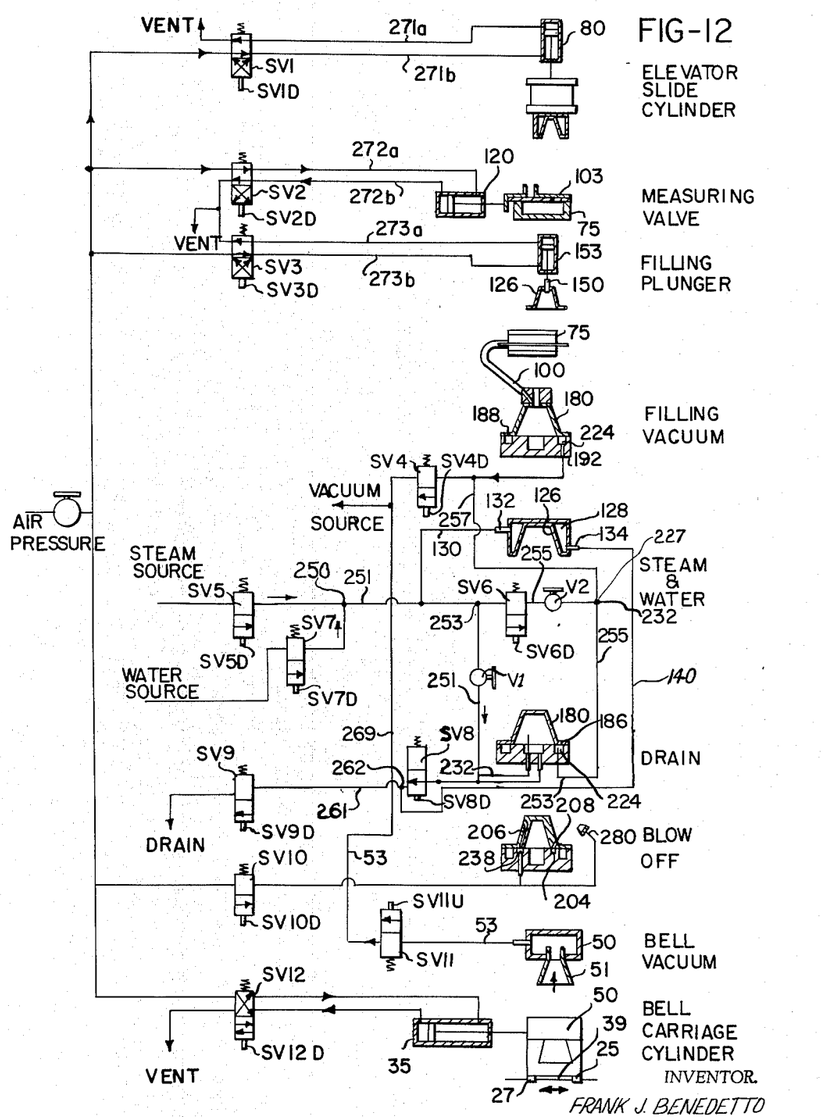
FIG. 12 is a schematic view of the functioning parts of the apparatus, showing in diagram form the valve and operating parts properly connected to the operating energy sources.
Figure 13:
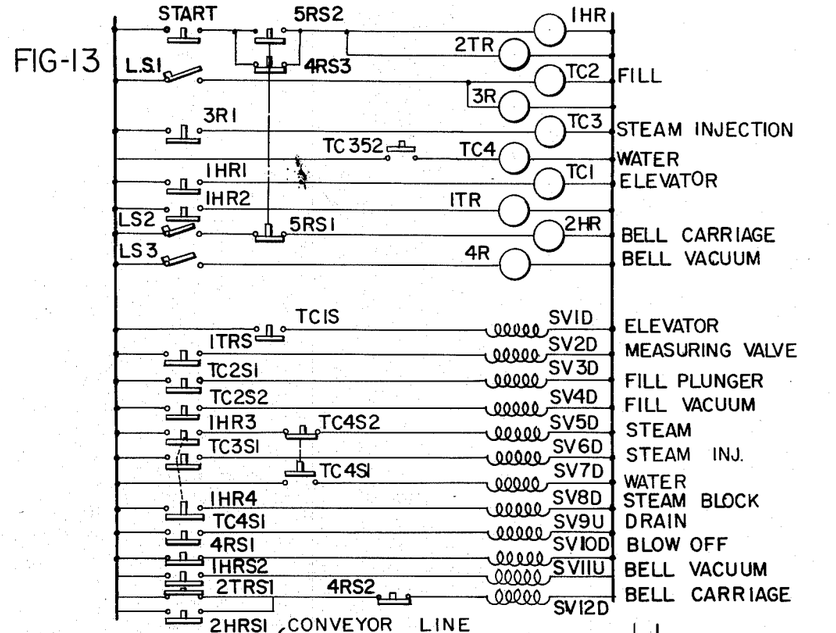
FIG. 13 is a schematic electrical ladder diagram merely illustrative of one control system for effecting automatic control of the apparatus.
Figure 14:
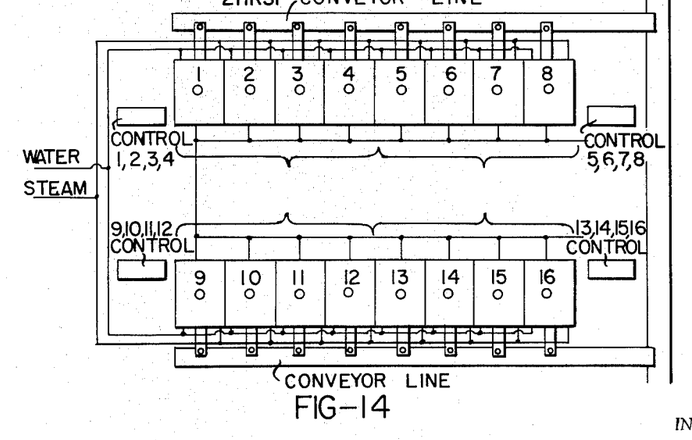
FIG. 14 illustrates a mode of "banking" the individual machines illustrated in FIGS. 1 through 11, into an integrated commercial operation.

Assuming that all sources of vacuum, air, water and steam pressures are energized and running, the position of the various valves SV1 through 12 is as shown in FIG. 12 and the various switches and contacts are either normally open or normally closed as schematically shown in FIG. 13.

Upon closing of the start switch SV holding relay 1HR is energized to close switches 1HR1, 1HR2 and 1HR3 and relay 2R closes switch 2R1S. Switch 1HR1 energizes timer control TC1 and, in turn, switch TC1S, solenoid SV1D and valve SV1 to reverse the air pressure exerted on cylinder 80 and the elevator slide starts to move down. Timer control TC1 is conventional and provides for an adjustable dwell period of energization, hence, closing, of switch TC1.

Simultaneously switch 1HR2 closes, energizing a time delay relay 1TR which closes switch 1TRS energizing solenoid SV2D and valve SV2 shifts moving the valve plate to its filling position over the measuring cup reservoir. The relay holds the switch 1TRS closed for a period, very brief, so as to assure filling of the reservoir, after which it opens and the valve plate is moved by cylinder 120 back to a closed position.

Switch S1HR3 and 1HR4 also close energizing solenoids SV5D and SV8D to open steam valve SV5 and close normally open valve SV8 admitting steam to the chambers 128 and the interior of the male mold 180 preheating same to evaporate moisture from the mold surfaces but blocking steam from the drain lines during the period of steam flow through the upper mold drain line during the steam cycle.

Simultaneously, energization of relay 2TR closed switch 2TRS1 energizing solenoid SV12D such that valve SV12 moves to pressurize the rod end of cylinder 35 and the bell carriage is held as illustrated in FIGS. 1 and 4.

It will be noted that as the elevator slide moves down it contacts limit switch LS2, but because of the closing of timer relay switch 2TR, switch 2TRS1 is open, and this switch has no effect on solenoid valve SV10 which controls the bell collector cylinder 35.

Meanwhile and concurrently with the action of valve 35, the elevator slide has moved down to close mold parts 10 and 20 into cavity-defining association. As it does so, it trips limit switch LS1, energizing timer control TC2.

This control closes normally open switches TC2S1 and TC2S2 energizing solenoids SV3D and SV4D. Solenoid SV3D causes valve SV3 to reverse the air pressure flow through the lines 273a and 273b leading to the filling plunger cylinder 153 which is then opened to unblock port 170 and vents 168, etc. Simultaneously solenoid SV4D acts to open vacuum valve SV4. Valve SV6 is closed blocking steam to prevent its being drawn into the vacuum lines.

As a vacuum is drawn through line 232 and chamber 224 in the base member 220, an air current is drawn between the wall of the mold part 180 beneath the annular plate 194 through the groove 188. Since the top of the mold is both vented by ports 162 et seq. and also in communication with filling tube 100 through port 170, a vacuum is also drawn in the measuring cup 75, and as has been described, the particulate or bead material is caused to evacuate the cup and is carried into the molding cavity which is filled with the necessary amount of material to secure proper expansion and unification of the same into a unitary object.

After a suitable period, usually merely a few seconds determined to be adequate, timer control TC2 opens and the vacuum is cut off as valve SV4 closes and simultaneously valve SV3 again reverses to pressurize the head end of plunger cylinder 153 and the plunger 150 closes blocking port 170 and vent ports 162, 164, 168.

The closing of limit switch LS1 also energizes a time delay 3R which, in turn, closes switches 3R1 to energize timer controls TC3 and TC4. These controls are conventional and provide for an adjustable period of actuation after which they automatically reset. The relay 3R is set to provide for the filling period before closing, after which the timer control TC3 energizes closing switches TC3S and TC3S2, the latter of which blocks control TC4 until timer control TC3 has terminated its actuation period. However, solenoid SV6D is energized and valve SV6 is opened and since valve SV5 is already open, steam is passed directly into line 232 to the chamber 224 and through the groove 188 and thus into the molding cavity. The mold elements 10 and 20 are thus heated, in turn, transmitting heat by conduction to the material in the molding cavity while at the same time steam is injected directly therein via the annular port defined between cover plate 194 and the molding surface 180.

While the precise reasons for the results obtained are not fully known, nonetheless, it has been found that products, particularly thin wall products, manufactured in this fashion, exhibit a markedly greater degree of flexibility and lack of brittleness than similar products manufactured by heating of the mold walls only.

After a suitable period of time, sufficient to cause expansion of the materials and welding of the particles or cells, one to the other, the timer control TC3 de-energizes and valve SV6 closes via de-energization of solenoid SV6D to cut off the steam injection. Simultaneously valve SV8 again opens unblocking the drain line from the lower mold part.

Almost simultaneously with the cut off of valve SV6D, timer control TC4 actuates as switch TC3S2 closes to close normally open switch TC4S1 and open normally closed switch TC4S2. The opening of switch TC3S2 de-energizes solenoid SV5D and valve SV5 closes cutting off the steam to the lines 130 and 251 and the mold ports. Simultaneously, closing of switch TC4S1 energizes solenoid SV8D to open valve SV8 and, hence, water and drain lines 130 and 251 and 140 and 161 so that water flow into the mold parts 10 and 20 begins immediately. After a suitable dwell period, timer control TC4 de- energizes, opening switch TC3S1 cutting off the water flow and closing switch TC3S2 so that steam valve SV5 can again open to admit steam to the mold parts when timer control TC3 is again energized. It will be noted that valve SV6 prevents entry of water into the vacuum line 255.

Since the elevator slide cylinder 80 is under the control of timer control TC1, the dwell time of this control is adjusted to provide for almost simultaneous opening of switch TC1S with that of switches TC3S1 and S2. Thus, at the approximate moment the water cuts off the solenoid SV1D is de-energized and valve SV1 is biased back to the position shown in FIG. 13, so that elevator cylinder 80 is pressurized at its rod end and begins to open the elevator slide. As the slide moves up, limit switch LS2 is again tripped with the result that holding relay 2HR is energized opening normally closed switch 2HRS1. Since timer relay 2TRS has de-energized and, hence, switch 2TRS is now open, the opening of switch 2HRS1 causes valve SV12 to shift, pressurizing the head end of bell carriage cylinder 80. The carriage thus moves into position over the mold part 10 as the elevator reaches its open position. Simultaneously, relay 2HR closes normally open switch 2HRS2 and valve SV10 opens to permit a vacuum to be drawn through chamber 50 and bell collector.

As the collector slide reaches its final position over the male mold member, it contacts a limit switch LS3, this switch closes momentarily to energize relay 4R. Relay 4R closes switch 4R1S to open valve SV10 via solenoid SV10D and air is admitted to line 281 passing through the base 220 via port 238 and then into ports 206 and 208 whereupon the molded object is lifted from the mold port 180 and simultaneously blown by air pressure through nozzle 280 up and into the bell collector 51. Simultaneously, relay 4R also opens the circuit to solenoid valve SV12 via the opening of normally closed switch 4RS2 and the solenoid SV12D is de-energized, valve SV12 returning to its de-energized position such that the bell carriage cylinder pressure is reversed and the carriage moves back to its alternative discharge position carrying with it the finished product. Meanwhile, switch 4RS3, also actuated from relay 4R, opens breaking the circuit to relay 1HR.

As the carriage reaches its extreme position, it contacts limit switch LS4. This switch opens via relay 5R, switch 5RS1 deenergizing holding relay 1HR and valve SV11 closes so that the product is dropped from the bell collector onto a suitable conveyor or the like. Relay 5R also closes normally open switch 5RS2 which energizes holding relay 1HR and the cycle is restarted.

It will be appreciated that though not shown in detail, the electric circuit can be modified to include manually-operable switches wherein the various relays may be operated manually during the initial operating cycles of the apparatus to enable timer controls TC1, TC2, etc., to be properly set to assure adequate time in each phase of operation, particularly the filling, heating and cooling phases of each cycle.

To this point, the description has been directed to a single machine producing products on a single pair of mold parts, and to its operation. Reference to FIG. 12, however, will indicate that it is within the contemplation of the invention to bank a series of machines together under a plurality of master control panels wherein a multiplicity of receptacles can be produced simultaneously. As illustrated in FIG. 12, a series of identical machines are grouped in banks of fours, each group having a single control panel. The machines are supplied with air, steam and water from a common manifold system and discharge completed products into two conveyor lines which, in turn, feed to a common collection conveyor. Thus, it may be seen that in a commercial installation, a considerable volume of production can be generated by the apparatus herein described and claimed.

As has been mentioned previously, the apparatus will operate in a completely satisfactory manner whether upright or disposed on its side. The only change which must be made would be the disposition of measuring cup 75 in a horizontal position on plate 63. Such a modification is well within the skill of an ordinary mechanic involving only the relocation of bracket 121 and cylinder 120.

It will also be apparent that various modifications may be made, all of which fall within the spirit and scope of the invention which is limited only as defined in the appended claims.

I claim:

1. In a molding machine for expanding and fusing expandable bead-like thermoplastic materials into self-sustaining articles, a pair of complementary mold elements adapted, when closed, to define a molding cavity therebetween; means for filling said cavity comprising a material source, a measuring cup and means including a valve connecting said material source to said cup, said cup comprising a material receiving chamber having at least two apertured walls, a ported plug disposed in one of said walls, a nipple connector disposed in the other of said walls, a hollow tube carried by said plug, said tube having one end disposed and terminating at a point lying a substantial distance within said nipple connector and its opposite end disposed outside of the opposite wall; a tubular conduit connected to said nipple having its opposite end in communication with said molding cavity; means for creating a vacuum suction in said molding cavity whereby air is drawn through said cavity, said ported plug and said tube, the air passing therethrough creating a pressure drop within said cup to assure evacuation of said cup and filling of the molding cavity.

2. A molding machine as defined in claim 1, wherein one of said mold elements is a female mold element and the other of said mold elements is a male mold element.

3. A molding machine as defined in claim 2, wherein said mold elements are of complementary frusto-conical shape.

4. A molding machine as defined in claim 2, further characterized by and including means for admitting steam into the molding cavity surrounds the base of said male mold element.

5. A measuring and filling cup for molding machines adapted to mold thermoplastic particulate material into self-sustaining objects comprising a cup body, a cover plate for said cup body, an aperture in said plate, a further plate means disposed adjacent to and movable with respect to said cover plate, an aperture in said movable plate, means for moving said last-mentioned plate relative to said cover plate to register said apertures, an outlet in said cup body, a port in said body, tube means passing from said outlet to the atmosphere and means for impressing a flow of air through said cup body said port and said tube means when said apertures in said plates are out of register to draw material deposited in said cup body through said apertures, when in register, from said cup body through said outlet.

References Cited by the Examiner

UNITED STATES PATENTS

| | | | |
|---|---|---|---|
| 2,029,408 | 2/1936 | Bramsen et al. | 222—193 |
| 2,792,151 | 5/1957 | Wagner | 222—193 |
| 2,951,260 | 9/1960 | Harrison et al. | 18—5 |
| 3,028,625 | 4/1962 | Dawson | 18—5 |
| 3,069,725 | 12/1962 | Root | 18—5 X |
| 3,139,466 | 6/1964 | Couchman et al. | 18—5 X |
| 3,162,704 | 12/1964 | Attanasio et al. | 18—5 X |

OTHER REFERENCES

Plastic Engineering, February 1961 (pages 107–112 and 180–185).

J. SPENCER OVERHOLSER, *Primary Examiner.*

WILLIAM J. STEPHENSON, MICHAEL V. BRINDISI, *Examiners.*